United States Patent [19]

Tomita et al.

[11] Patent Number: 4,693,133
[45] Date of Patent: Sep. 15, 1987

[54] NOISE REDUCTION IN GEAR TRANSMISSION

[75] Inventors: Takao Tomita; Noriaki Kawai, both of Saitama, Japan

[73] Assignee: Honda Giken Kogyo Kabushiki Kaisha, Tokyo, Japan

[21] Appl. No.: 499,879

[22] Filed: Jun. 1, 1983

[30] Foreign Application Priority Data

Jun. 18, 1982 [JP] Japan ................... 57-104718
Jun. 18, 1982 [JP] Japan ................ 57-91034[U]

[51] Int. Cl.⁴ .......................................... F16H 57/04
[52] U.S. Cl. ................... 74/467; 74/606 R; 184/6.12
[58] Field of Search ........... 74/467, 606 R, 606 A; 184/11 R, 6.12, 15.1, 13.1

[56] References Cited

U.S. PATENT DOCUMENTS

| | | | |
|---|---|---|---|
| 1,151,271 | 8/1915 | Johansson | 74/467 X |
| 1,220,810 | 3/1917 | Alquist | 74/467 |
| 1,220,811 | 3/1917 | Alquist | 74/467 |
| 1,554,081 | 9/1925 | Garrett | 74/467 |
| 1,813,819 | 7/1931 | Ross | 74/606 R |
| 2,242,195 | 5/1941 | Teker et al. | 184/11.1 |
| 2,292,086 | 8/1942 | Pritchard | 184/11.1 |
| 2,464,012 | 3/1949 | Wallace | 184/11.1 |
| 2,633,208 | 3/1953 | Randt | 184/13.1 |
| 2,645,305 | 7/1953 | Roos | 184/11.1 |
| 2,867,130 | 1/1959 | Moeller | 74/467 |
| 2,981,373 | 4/1961 | Ranst | 74/467 X |
| 3,186,255 | 6/1965 | Schmitter et al. | 74/606 R |
| 3,444,960 | 5/1969 | Killius et al. | 74/467 X |
| 3,515,011 | 6/1970 | Johnson | 74/467 |
| 3,529,698 | 9/1970 | Nelson | 184/11.2 X |
| 3,601,515 | 8/1971 | Pellizzoni | 74/467 X |
| 4,414,861 | 11/1983 | Witt | 74/467 X |
| 4,420,996 | 12/1983 | Hauser | 74/467 |
| 4,480,492 | 11/1984 | Fujioka et al. | 74/467 |
| 4,498,553 | 2/1985 | Kurata et al. | 74/606 R |

FOREIGN PATENT DOCUMENTS

| | | | |
|---|---|---|---|
| 53-132652 | 11/1978 | Japan | 74/467 |
| 55-126157 | 9/1980 | Japan | 74/467 |
| 56-14657 | 2/1981 | Japan | 74/467 |
| 56-14656 | 2/1981 | Japan | 74/467 |
| 56-55755 | 5/1981 | Japan | 74/467 |
| 951364 | 3/1964 | United Kingdom | 184/6.12 |
| 1426352 | 2/1976 | United Kingdom | 74/467 |
| 649910 | 2/1979 | U.S.S.R. | 74/467 |

Primary Examiner—Leslie Braun
Assistant Examiner—Martin G. Belisario
Attorney, Agent, or Firm—Lyon & Lyon

[57] ABSTRACT

A system of lubricated gearing illustrated in the context of a motorcycle transmission. A lubricant vessel is provided to partially enclose the lower portion of the drive gear to deliver additional lubricant thereto. Walls extend radially outwardly adjacent to the drive gear to retain lubricant within the meshing area of the gears, reducing gear noise and impact shock between meshing gear teeth.

7 Claims, 15 Drawing Figures

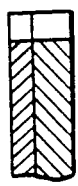
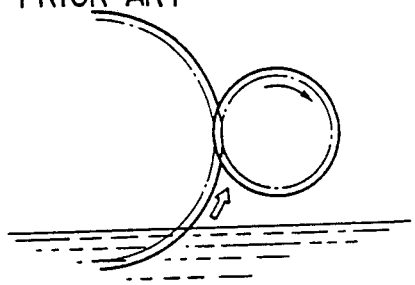
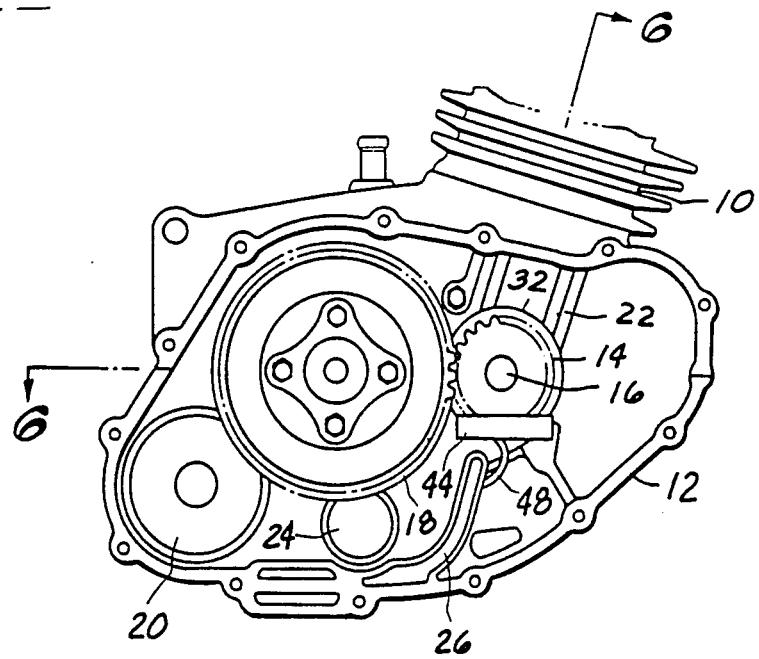

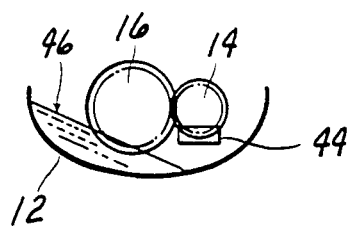
Fig. 11.
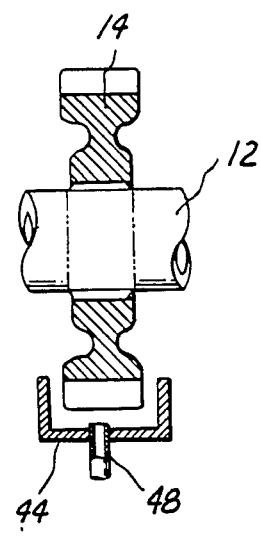
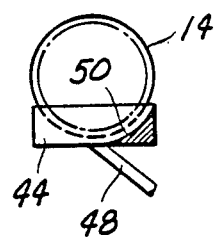
Fig. 12.
Fig. 13.

NOISE REDUCTION IN GEAR TRANSMISSION

BACKGROUND OF THE INVENTION

The field of the present invention is lubricated gearing; and more specifically lubricated gearing particularly adaptable to vehicle transmissions.

Gearing associated with vehicles and particularly exposed transmissions for motorcycles and the like can produce significant, objectionable noise. Gear noise resulting from the individual contact of gear teeth is often present due to backlash in the gears. Such noise may result from torque fluctuation to the drive gear. The gear teeth impacting noise may be reduced by reducing backlash. However, in doing so, a buzzing noise may be induced which is caused by the rubbing of the faces of the gear teeth. The remedies for the two sources of noise, gear tooth impacting and buzzing, are counterproductive. This condition makes it extremely difficult to minimize both noises.

In addressing the foregoing problem, two current solutions are illustrated in FIGS. 1 and 2. Looking first to FIG. 1, a driven gear is illustrated as being composed of two gear wheels which are arranged in juxtaposition to rotate together. One of the two wheels is angularly biased by a spring or the like such that the teeth are slightly angularly misaligned. This enables the driven gear to exert resilient pressure against the drive gear to reduce backlash noise without as much buzzing noise as might otherwise occur.

FIG. 2 illustrates another driven gear composed of two gear wheels. The two gear wheels are brought together with an angular friction force therebetween. The smaller of the two gear wheels has one less tooth than the larger, power transmission wheel. The friction force between the gears causes the exta gear to drag on the power transmission gear so as to cause positive meshing with the drive gear. As with the device of FIG. 1, backlash noise may be mechanically controlled. However, optimum buzzing noise is not achieved. As a result, neither solution is totally satisfactory. With substantial drive torque fluctuation in either system, an increased force between the two gears is necessary, spring force for the device of FIG. 1 and friction force for the device of FIG. 2. However, in increasing the relative force between gear wheels, a greater tendency to produce buzzing exists.

Naturally, lubricant has a tendency to reduce gear noise. However, conventional lubrication in power transmissions, particularly for motorcycles, employs the splashing of lubricant from one of the gears, see FIG. 3. The results are sufficient for lubrication but do not provide sufficient amounts of lubricant for noise reduction.

SUMMARY OF THE INVENTION

The present invention pertains to the reduction of noise in lubricated gears. To this end, increased lubricant is provided to the gear. In a first aspect of the present invention, this result is achieved by the use of walls adjacent to a gear wheel to inhibit lubricant flow away from the gear. In a second aspect of the present invention, an auxiliary vessel is employed for providing additional lubricant to the gear.

Accordingly, it is a principal object of the present invention to reduce gear noise by an improved lubricated gear system. Other and further objects and advantages will appear hereinafter.

BRIEF DESCRIPTION OF THE DRAWINGS

FIG. 1 is a prior art drawing illustrating a gear mechanism in cross section in FIG. 1A and a side view thereof in FIG. 1B.

FIG. 2 is a cross-sectional view of yet another prior art gear mechanism.

FIG. 3 is a prior art schematic elevation illustrating splash lubrication.

FIG. 4 is a side view of a motorcycle engine employing the present invention with the side cover of the transmission removed for clarity.

FIG. 11 schematically illustrates a side view of a gear of the present invention.

FIG. 12 is a more detailed view of the drive gear wheel of FIG. 11.

FIG. 13 is yet another embodiment illustrated in cross-sectional elevation.

DETAILED DESCRIPTION OF THE PREFERRED EMBODIMENT

Figure 5:
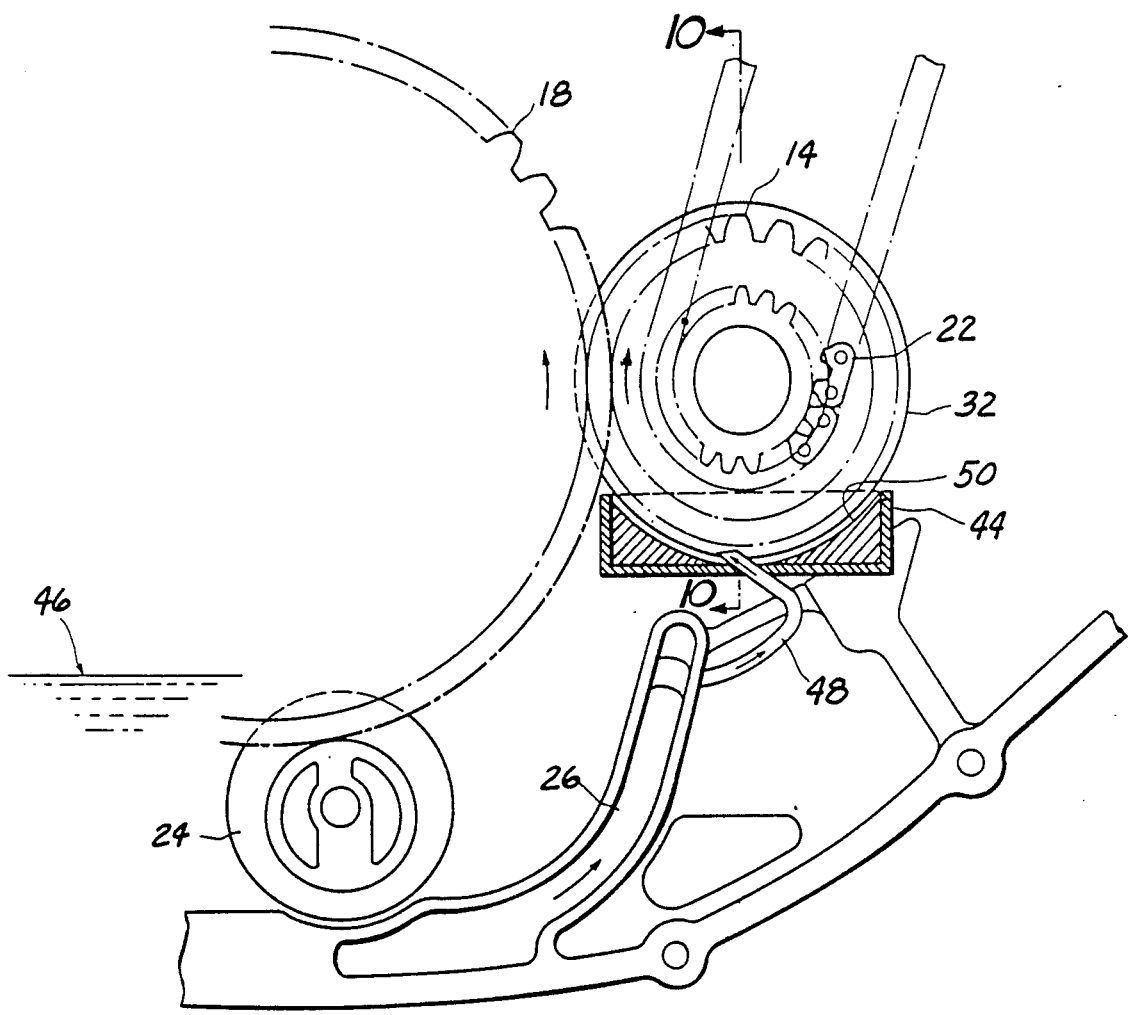
FIG. 5 is a detailed view of the device of FIG. 4.

Turning in detail to the drawings, a first embodiment of the present invention is generally illustrated in FIG. 4 within the context of its environment in association with a motorcycle engine. The assembly includes a cylinder 10 in association with a crankcase 12 within which a gear is assembled. A drive gear wheel 14 is mounted to rotate with a crankshaft 16 and drive a driven gear wheel 18. Additionally illustrated is a kick gear 20, a timing chain 22, an oil pump 24 and a lubricant supply manifold 26 from the oil pump 24.

Figure 6:
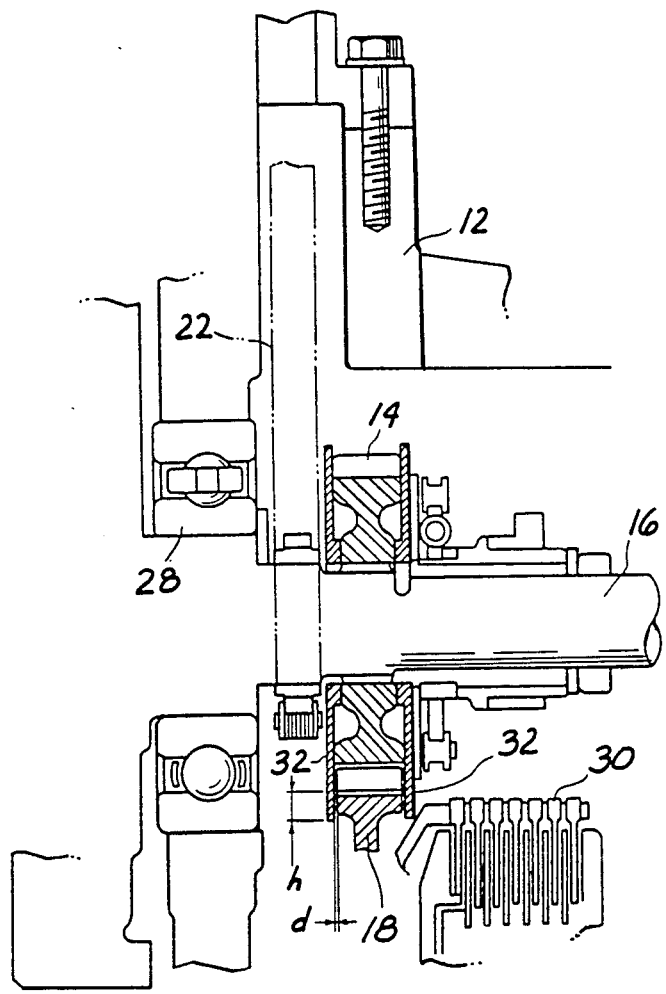
FIG. 6 is a cross-sectional plan view taken along line 6—6 of FIG. 4.

As illustrated in further detail in FIG. 6, the drive shaft 16 is supported by a bearing 28. A clutch 30 may also be included within the assembly.

Looking first to the drive gear wheel 14, it conventionally includes a hub with gear teeth positioned about the periphery thereof. It will be recognized by one of ordinary skill in the art that a variety of types of gear wheels and gear teeth may be employed in accordance with the teachings of the present invention. Positioned on either side of the gear wheel 14 are walls 32. In FIGS. 5, 6, 7 and 10, the walls 32 are illustrated to be fixed to the gear wheel 14 on either side thereof extending radially outwardly from adjacent the hub to past the teeth of the wheel 14. The two walls 32 are thus adjacent the gear teeth to form a barrier around the teeth for retaining lubricant in close proximity thereto. It can be seen in FIG. 6 that the walls 32 extend outwardly from the periphery of the gear wheel 14 by a convenient amount "h".

In the embodiment specifically illustrated in FIG. 6, plates are fastened to the sides of the gear teeth 14 to form the walls 32. Screws or rivets may be employed at the base of the gear teeth to fix these plates in position so as to avoid deflection. Additionally, the embodiment of FIG. 6 is shown to have the plates or walls 32 located on the drive gear. The drive gear in the context of this preferred embodiment is shown to be smaller than the driven gear. Provision of the plates on gear wheel 14 exhibits smaller plate deflection than might be exhibited were a larger plate required for the gear wheel 18. A clearance "d" is illustrated in FIG. 6 between each wall 32 and the mating side of the gear wheel 18. This clearance prevents interference between meshing of the gear teeth and the walls 32 as well as friction between these components.

Figure 8A:
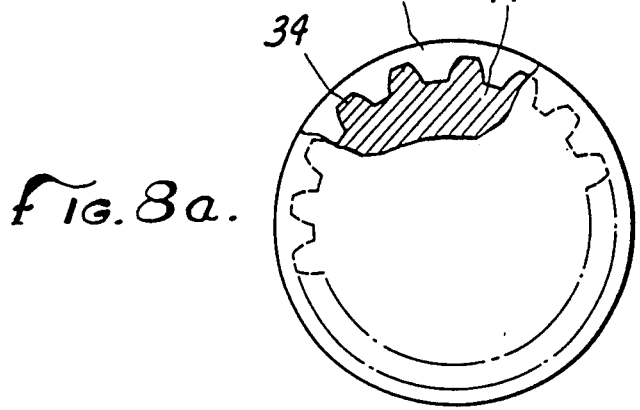
FIG. 8 illustrates a gear of the present invention including integral walls, FIG. 8a being a side view and FIG. 8b being a cross-sectional elevation.
Figure 8B:
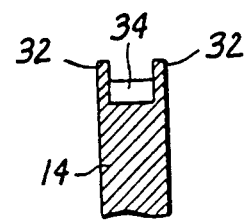
Figure 9:
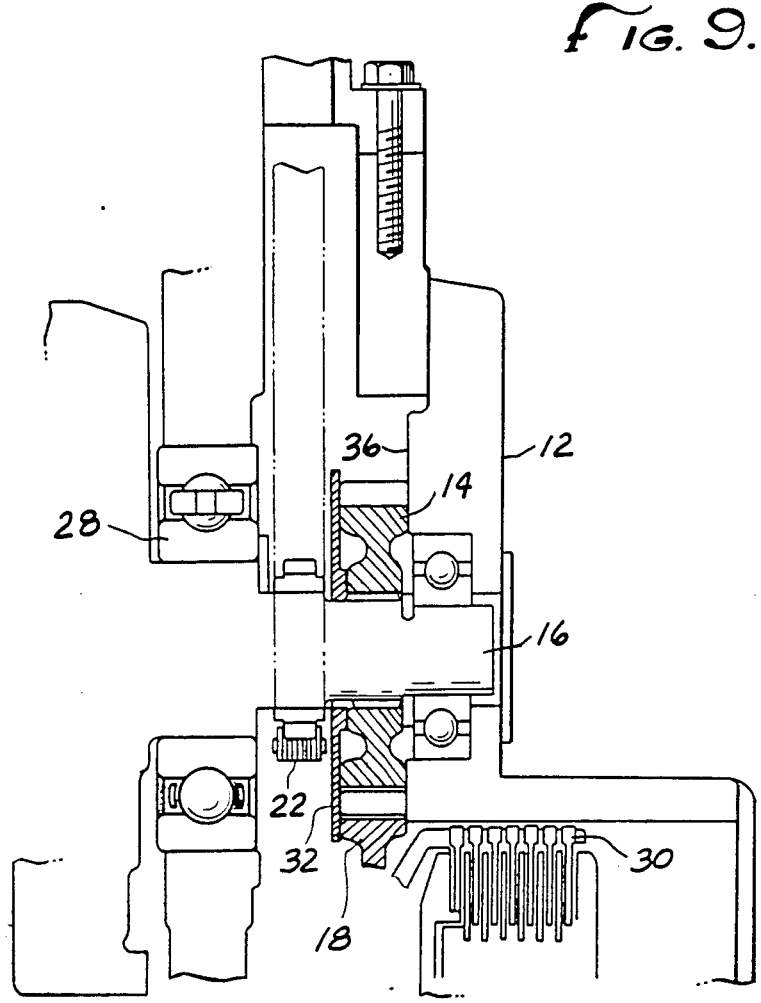
FIG. 9 illustrates yet another embodiment of the present invention taken along line 6—6 of FIG. 4.
Figure 10:
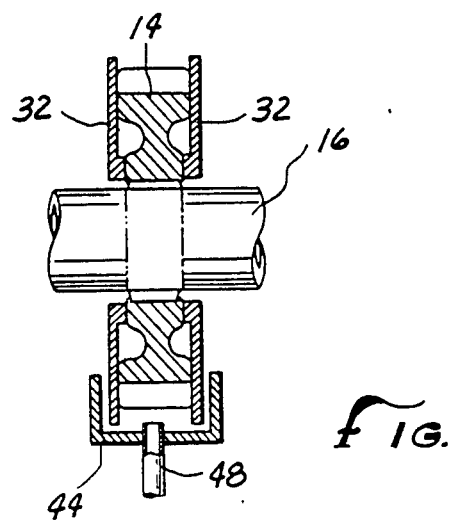
FIG. 10 is a cross-sectional elevation taken along line 10—10 of FIG. 5.

Additional arrangements of the walls 32 are illustrated in FIGS. 8 and 9. In FIG. 8, the teeth 34 of the gear wheel 14, and indeed the hub, are shown to be integrally formed with the walls 32. Such a gear wheel may be produced by means of a sintering process.

In FIG. 9, a first enclosed wall 32 is positioned on one side of the gear wheel 14. A second wall 36 on the opposite side adjacent the gear wheel 14 is provided by means of the casing 12. Naturally, some clearance between the gear wheel 14 and the surface 36 of the casing 12 preferably exists to avoid friction losses and wear.

Figure 7:
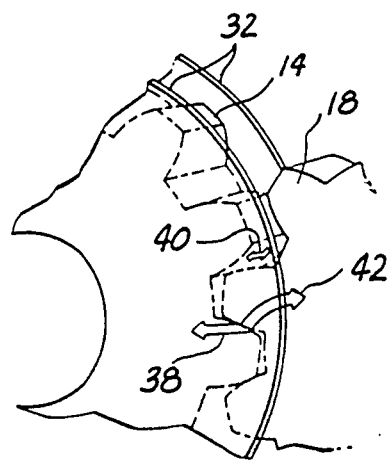
FIG. 7 is a detailed perspective of a gear of the present invention.

Looking then to the oil flow as constrained by the devices of FIGS. 4 through 10, reference is made to FIG. 7. In FIG. 7, arrows 38 and 40 illustrate the normal flow of lubricant from between meshing gear teeth absent the teachings of the present invention. As can be seen from the illustration, this flow is outwardly away from the gear where it generally would be recycled through the lubricant system before arriving back at the lubricated surfaces. With the walls 32 in position, the flow of lubricant is generally as indicated by arrow 42. The flow of lubricant can then only flow through the clearances d between the walls 32 and the gear wheel 18. This restriction to flow of the lubricant retains the lubricant in the area of meshing so as to absorb the shock of impacting tooth faces, even during torque fluctuation. In this way, buzzing noise and gear hitting noise can be reduced.

The effect of the employment of the walls 32 may be optimized by empherical study for any gear to obtain maximum noise attenuation with minimum loss of gear efficiency or the like. This may be accomplished by appropriately establishing the clearance d and by consideration of the extent of the radial projection of the walls 32 as measured by h.

To provide further lubricant to the meshing gear for noise reduction, a lubricant vessel 44 is employed to extend about a portion of the gear wheel 14. This lubricant vessel is shown to be elevated above the lubricant sump having a sump level at 46. Lubricant is supplied through the lubricant manifold 26 to passageway 48 which in turn delivers the lubricant to the vessel 44. The passageway 48 provides a feed line which directs lubricant at the gear wheel 14. As can be seen in FIG. 5, this feed line directs lubricant generally along a tangent line to the wheel 14 in the direction of gear rotation. Inded, the lubricant is directly conveyed to the meshing area of the gear. The level of the lubricant is, therefore, less critical, even under conditions of acceleration and tipping such as illustrated in FIG. 11.

The bottom surface 50 of the lubricant vessel 44 is arcuate to approximate the curve of the gear teeth as may best be seen in FIG. 5. This is believed to aid in the delivery of lubricant to the gear wheel 14.

In operation, lubricant is supplied by means of the oil pump 24 through the manifold 26 and passageway 48 into the lubricant vessel 44. The lubricant is directed somewhat tangentially to the gear wheel 14 both because of the direction of the passageway 48 and the bottom surface 50 of the lubricant vessel 44. The direction of such lubricant feed causes the lubricant to be directly supplied into the meshing area of the gear to both lubricate and attenuate noise. Oil is also preferably delivered to the meshing area by the conventional splashing from the sump lubricant. In cooperation with the walls 32, the introduced lubricant reduces noise and the impacting shock between intermeshing teeth.

Accordingly, a gear system is disclosed for a transmission which is designed to reduce noise through delivery of lubricant to the meshing area of the gear and through retention of the lubricant in that area. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A lubricated gear system in a vehicle transmission comprising:
   first and second gear wheels including hubs rotatable about spaced, parallel axes and having gear teeth about the periphery of each of said hubs adapted for mutual meshing engagement;
   means forming a wall on each side of said gear teeth substantially closing the spaces between adjacent gear teeth about the periphery of said first gear wheel, said means being sufficiently radially extensive to overlie the ends of the gear teeth on both of said gear wheels in th region of their meshing engagement;
   a sump containing a body of fluid lubricant disposed subjacent said second gear wheel and whereby the lower peripheral region of said second gear which is immersed in said sump;
   a vessel separate from and elevated above said sump in subjacent relation to said first gear wheel and forming an enclosure about the lower peripheral region of said first gear wheel which enclosure extends to a point in close proximity to the region of meshing engagement between the teeth of the respective gear wheels;
   means for forming a lubricant supply tube penetrating said vessel and adapted to discharge lubricant directly on the teeth of said first gear wheel; and
   a pump operatively connected between said sump and said lubricant supply tube for supplying lubricant from said sump to said supply tube.

2. The lubricated gear system of claim 1 wherein said lubricant supply means includes a feed line to said vessel extending along a tangent to said first gear wheel toward the direction of gear rotation.

3. The lubricated gear system of claim 2 wherein said vessel has an arcuate bottom extending adjacent a portion of the peripheral of said first gear wheel.

4. The lubricated gear system of claim 1 wherein at least one said wall fixed to said first gear wheel, said walls extending radially outwardly of the periphery of said first gear wheel, said vessel surrounding a lower portion of at least said one of said walls.

5. The lubricated gear system of claim 4 wherein both said walls are fixed to rotate with said first gear wheel.

6. The lubricated gear system of claim 4 including a clearance space between each of said walls and said second gear wheel at the meshing engagement of said first and second gear wheels.

7. The lubricated gear system of claim 6 wherein said walls are integrally formed on said first gear wheel.

* * * * *

UNITED STATES PATENT AND TRADEMARK OFFICE
CERTIFICATE OF CORRECTION

PATENT NO. : 4,693,133
DATED : September 15, 1987
INVENTOR(S) : Takao Tomita et al.

It is certified that error appears in the above—identified patent and that said Letters Patent is hereby corrected as shown below:

In claim 1, line 12, delete "th" and insert therefor -- the --.

In claim 1, line 16, delete "which" and insert therefor -- wheel --.

Signed and Sealed this

Twenty-sixth Day of April, 1988

Attest:

DONALD J. QUIGG

Attesting Officer       Commissioner of Patents and Trademarks